United States Patent Office 3,415,892
Patented Dec. 10, 1968

3,415,892
FLUORINATED CYCLIC ALCOHOLS
Ogden R. Pierce, George A. Grindahl, and Anthony J. Butler, Midland, Mich., assignors to Dow Corning Corporation, Midland, Mich., a corporation of Michigan
No Drawing. Original application Feb. 7, 1964, Ser. No. 343,201, now Patent No. 3,249,596, dated May 3, 1966. Divided and this application June 24, 1965, Ser. No. 466,830
5 Claims. (Cl. 260—617)

This application is a division of U.S. application Ser. No. 343,201, filed Feb. 7, 1964, now U.S. Patent No. 3,249,596.

This application relates to new fluorinated cyclic alcohols which are useful as polymer precursors. The polymers prepared from these alcohols have properties similar to the polyacrylate plastics, but they exhibit added thermal stability and solvent resistance due to the large amount of fluorine that is present in the composition. Thus, they are useful for coatings and in making molded articles.

The fluorinated cyclic alcohols of this invention have the general formula of

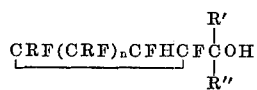

where R can be fluorine, hydrogen, or a perfluoroalkyl radical, R' and R" are lower alkyl radicals or hydrogen, and $n$ is an integer of 1 through 3.

These alcohols can be made by reacting

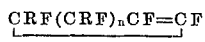

with

in the presence of a free radical initiator such as ditertiary butyl peroxide at a temperature above the dissociation temperature of the free radical initiator, usually about 75° C. The maximum temperature is the point where the initiator dissociates too fast, about 150° C. The alcohol adds across the double bond of the cyclofluoroolefin, an alpha-hydrogen of the alcohol going to one olefinic carbon atom and the alcohol itself going to the other.

R can be fluorine, hydrogen, or any perfluoroalkyl radical such as trifluoromethyl, pentafluoroethyl, perfluoroisobutyl, or perfluorooctyl.

R' and R" can be hydrogen or any lower alkyl radical such as methyl, ethyl, isobutyl, or hexyl.

The alcohols of this invention can be esterified with acrylic or methacrylic acid to form monomers from which the polymers of this invention can be made.

The esterified composition of this invention has the following formula:

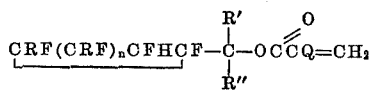

where Q is either methyl or hydrogen.

These esters polymerize in the presence of free radical generators such as ditertiary butyl peroxide, through the opening up of the double bond on each ester molecule to form long chain polymers with pendent groups, each polymer unit, therefore, being

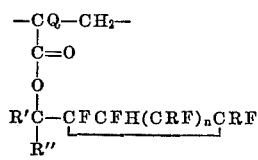

The following examples are illustrative only and should not be construed as limiting the invention, which is properly delineated in the appended claims.

Example 1

484 g. of perfluorocyclopentene, 150 g. of anhydrous methanol, and 10 g. of ditertiary butyl peroxide were placed in an evacuated, chilled stainless steel bomb. The bomb was placed on a rocker and heated overnight at 120° C. the heat being controlled by an inside thermocouple.

The bomb was removed from the rocker, chilled, vented, and the contents fractionated.

266 g. of

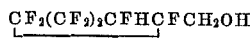

were recovered, which is 78% of the theoretical yield.

Example 2

A stainless steel bomb was evacuated, chilled, and charged with 316 g. of perfluorocyclopentene, 140 g. of absolute ethanol, and 7 g. of ditertiary butyl peroxide. The bomb was heated at 120° C. overnight.

The bomb was chilled, vented, and the contents fractionated.

A sizeable yield of

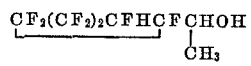

was recovered.

Example 3

When 15 g. each of the following fluorinated cycloolefins are reacted with 10 g. each of the following alcohols in the presence of 1 g. of ditertiary butyl peroxide, the following products are formed:

| Olefin | Alcohol | Product |
| --- | --- | --- |
| $\underline{CF_2CF_2CF{=}CF}$ | $\underset{CH_3}{\overset{CH_3}{\diagdown}}CHOH$ | $\underline{CF_2CF_2CHFCF}\underset{CH_3}{\overset{CH_3}{|}}OH$ |
| $\underline{C_6F_{13}CFCF_2CF{=}CF}$ | $C_6H_{13}CH_2OH$ | $\underline{C_6F_{13}CFCF_2CHFCF}CHOH$ <br> $\quad\quad\quad\quad\quad\quad\quad\quad\quad |_{C_6H_{13}}$ |
| $\underset{\underline{CH(CF)_2CF{=}CF}}{\overset{F\quad CF_3}{|\quad\;\;|}}$ | $CH_3CH_2\underset{CH_3}{\overset{|}{CH}}CH_2OH$ | $\underset{\underline{CH(CF)_2CFHCF}CHOH}{\overset{F\quad CF_3}{|\quad\;\;|}}$ <br> $\quad\quad\quad\quad\quad\quad |_{CHCH_2CH_3}$ <br> $\quad\quad\quad\quad\quad\quad\;\;|_{CH_3}$ |
| $\underline{CF_2(CF_2)_3CF{=}CF}$ | $C_2H_5CH_2OH$ | $\underline{CF_2(CF_2)_3CFHCF}CHOH$ <br> $\quad\quad\quad\quad\quad\quad |_{C_2H_5}$ |
| $\underline{CF_3CF(CFH)_3CF{=}CF}$ | $CH_3OH$ | $\underline{CF_3CF(CFH)_3CFHCF}CH_2OH$ |

Example 4

When 15 g. each of the following fluorinated cyclo-olefins are reacted with 10 g. each of the following alcohols in the presence of 1 g. of ditertiary butyl peroxide, the following products are formed:

| Olefin | Alcohol | Product |
| --- | --- | --- |
| $\underline{CF_2(CF_2)_3CF{=}CF}$ | $CH_3OH$ | $\underline{CF_2(CF_2)_3CFHCF}CH_2OH$ |
| $\underline{CF_2(CF_2)_3CF{=}CF}$ | $C_2H_5OH$ | $\underline{CF_2(CF_2)_3CFHCF}CHOH$ <br> $\quad\quad\quad\quad\quad\quad |_{CH_3}$ |

That which is claimed is:

1. A composition of the formula

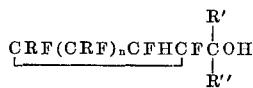

$$\underline{CRF(CRF)_nCFHCF}\underset{R''}{\overset{R'}{\underset{|}{\overset{|}{C}}}}OH$$

where R is selected from the group consisting of fluorine, hydrogen, and perfluoroalkyl radicals, R′ and R″ are each selected from the group consisting of hydrogen and lower alkyl radicals, and $n$ is an integer of 1 through 3.

2. $\underline{CF_2(CF_2)_2CFHCF}CH_2OH$

3. $\underline{CF_2(CF_2)_3CFHCF}CH_2OH$

4. $\underline{CF_2(CF_2)_2CFHCF}CHOH$ <br> $\quad\quad\quad\quad\quad\quad |_{CH_3}$ 5. $\underline{CF_2(CF_2)_3CFHCF}CHOH$ <br> $\quad\quad\quad\quad\quad\quad |_{CH_3}$

References Cited

UNITED STATES PATENTS

| | | | |
| --- | --- | --- | --- |
| 2,601,075 | 6/1952 | Wicklatz et al. | 260—617 X |
| 2,871,255 | 1/1959 | Molotsky et al. | 260—617 X |
| 3,283,012 | 11/1966 | Day | 260—617 |

OTHER REFERENCES

Coffman et al.: J. Am. Chem. Soc., vol. 71, p. 494 (1949).

Andreades et al.: J. Am. Chem. Soc., vol. 83, pp. 4670-1, (1961).

LEON ZITVER, *Primary Examiner.*

T. G. DILLAHUNTY, *Assistant Examiner.*